United States Patent
Guzman Trevino et al.

(10) Patent No.: US 12,296,399 B2
(45) Date of Patent: May 13, 2025

(54) ELECTRICAL DISCHARGE MACHINING ASSEMBLY INCLUDING ELECTRODE

(71) Applicant: Robert Bosch GmbH, Stuttgart (DE)

(72) Inventors: Luis Humberto Guzman Trevino, Tampico (MX); Cesar Omar Medina Juarez, San Luis Potosi (MX); John Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 753 days.

(21) Appl. No.: 17/547,998

(22) Filed: Dec. 10, 2021

(65) Prior Publication Data

US 2022/0184724 A1     Jun. 16, 2022

Related U.S. Application Data

(60) Provisional application No. 63/125,531, filed on Dec. 15, 2020.

(51) Int. Cl.
  *B23H 7/26*  (2006.01)
  *B23H 7/10*  (2006.01)

(52) U.S. Cl.
  CPC ............. *B23H 7/26* (2013.01); *B23H 7/10* (2013.01)

(58) Field of Classification Search
  None
  See application file for complete search history.

(56) References Cited

U.S. PATENT DOCUMENTS

| | | |
|---|---|---|
| 2,902,584 A | 9/1959 | Ullmann |
| 3,306,838 A * | 2/1967 | Johnson ............. B23H 9/006 219/69.15 |
| 3,497,663 A | 2/1970 | Turner |
| 4,449,595 A | 5/1984 | Holbert |
| 4,769,118 A | 9/1988 | Johns |
| 5,029,759 A | 7/1991 | Weber |

(Continued)

FOREIGN PATENT DOCUMENTS

| | | | | |
|---|---|---|---|---|
| CN | 109570660 A | * | 4/2019 | ............... B23H 1/04 |
| JP | 2001205523 A | * | 7/2001 | |

(Continued)

OTHER PUBLICATIONS

Machine translation of KR-200174350 Y1, Sep. 2024 (Year: 2024).*

(Continued)

*Primary Examiner* — Geoffrey S Evans
(74) *Attorney, Agent, or Firm* — Kelly McGlashen; Maginot, Moore & Beck LLP

(57) ABSTRACT

An electrical discharge machining (EDM) assembly includes a mounting device that is configured to support an EDM electrode relative to a work piece. The electrode includes an axial opening that extends between opposed ends of the electrode, a first portion that includes one end and a second portion that includes the opposed end. The flexibility of the first portion is greater than that of the second portion. For example, the first portion may be a helical spring and the second portion may be a rigid tube. The mounting device includes a back plate, an upright portion that protrudes from the back plate and a curved sleeve disposed in a through hole that extends through the back plate and the upright portion. The electrode is movably disposed in the sleeve.

19 Claims, 7 Drawing Sheets

(56) References Cited

U.S. PATENT DOCUMENTS

| | | | |
|---|---|---|---|
| 5,213,168 | A | 5/1993 | Warren et al. |
| 6,362,446 | B1 | 3/2002 | Jones et al. |
| 7,159,569 | B2 | 1/2007 | Keegan et al. |
| 7,469,680 | B2 | 12/2008 | Merchant et al. |
| 8,338,745 | B2 | 12/2012 | Liu |
| 9,810,189 | B2 | 11/2017 | Maier et al. |
| 10,436,163 | B2 | 10/2019 | Serra et al. |
| 10,473,075 | B2 | 11/2019 | Kubota et al. |
| 10,582,935 | B2 | 3/2020 | Burley et al. |
| 2011/0108005 | A1 | 5/2011 | Nishizawa et al. |
| 2013/0193000 | A1* | 8/2013 | Platz ................... B23H 7/22 204/286.1 |
| 2013/0312705 | A1 | 11/2013 | Isogai et al. |

FOREIGN PATENT DOCUMENTS

| | | | |
|---|---|---|---|
| JP | 2003089017 | A * | 3/2003 |
| JP | 2008302460 | A * | 12/2008 |
| JP | 2019217606 | A * | 12/2019 |
| KR | 200174350 | Y1 * | 4/2000 |

OTHER PUBLICATIONS

Machine translation of Japan Patent No. 2001-205,523-A, Sep. 2024 (Year: 2024).*
Machine translation of Japan Patent No. 2019-27,606, Sep. 2024 (Year: 2024).*
Machine translation of CN-109570660-A, Sep. 2024 (Year: 2024).*
Machine translation of JP-2003-089,017-A, Sep. 2024 (Year: 2024).*
Machine translation of JP-2008-302,460-A, Sep. 2024 (Year: 2024).*

\* cited by examiner

ELECTRICAL DISCHARGE MACHINING ASSEMBLY INCLUDING ELECTRODE

BACKGROUND

Electrical discharge machining (EDM) is a metal fabrication process whereby material is removed from a metal work piece by a series of rapidly recurring current discharges between an elect rode and a metal work piece. EDM may also be referred to as spark machining or arc machining.

The electrode and work piece are separated by a dielectric liquid and subject to an electric voltage. The dielectric fluid may be, for example, deionized water or a hydrocarbon oil. In EDM, an electrical current passes between the electrode and the work piece, The dielectric fluid acts as an electrical insulator until enough voltage is applied to bring the dielectric fluid to its ionization point, when it becomes an electrical conductor. The resulting spark discharge erodes the work piece to form a desired final shape.

EDM may provide an excellent surface finish, a minimal heat-affected zone and the ability to cut hardened materials and exotic alloys. In addition, EDM provides accurate and precise holes, even in hardened or exotic materials.

In some applications, EDM may employ a rigid, rotating conductive tube as the electrode to form a blind hole in the work piece. In this application, a continuous flow of dielectric is supplied to the work piece surface via the interior of the tube, which serves to refresh the dielectric fluid and flush the cut. However, due to the rigidity of the electrode, it can be difficult to form a blind hole that turns or changes direction within the work piece without using multiple attacks that provide intersecting holes. Such multiple attacks result in multiple openings in the work piece surface, which may be disadvantageous since any extraneous openings in the work piece surface used to form the passageway must be plugged and become leak risks. Thus, it is desirable to provide an electrode that can provide a change in direction of a hole formed in a work piece.

SUMMARY

An EDM assembly that includes a flexible electrode may be use to form complex blind holes in a work piece. An exemplary work piece is a monolithic fuel rail structure that is configured to provide high-pressure distribution of fuel to fuel injectors, which in turn supply the fuel to the cylinders of an engine. Although plastic fuel rails are known, metal fuel rails may be used to deliver fuel at high pressure, and include a main fluid supply pipe referred to as a "log". As used herein, the term "high pressure" refers to pressures greater than 200 bar. The log has a main fuel channel through which fuel is supplied from a fuel tank. The fuel rail includes distribution arms for distributing fuel to the individual cylinders of the engine. The distribution arms protrude from the log and provide fuel passages that communicate with the main fuel channel. The distribution arms each terminate in an injector cup (sometimes referred to as a bushing). Each injector cup includes a bore that receives and retains the inlet end of a fuel injector. The fuel injector inlet end includes a seal that cooperates with the bore to define a high pressure fuel distribution chamber within the injector cup. Fuel is provided at high pressure to the fuel distribution chamber via the main fuel channel of the log and the fuel passageways of the respective distribution arm. The relative geometry of the log, distribution anus and injector cups is complex, and is dependent on engine geometry and available space within the engine system.

The work piece is formed into a monolithic fuel rail structure using a manufacturing process in which the log, the distribution aims, and the injector cups, are formed integrally from a single billet of metal. The manufacturing process used to form the monolithic fuel rail structure may include, but is not limited to, extrusion, casting, forging and injection molding. Some conventional monolithic fuel rail structures may be finished by using a twist drill to machine the main fuel channel within the log, the fuel passage within each distribution arm, and the bore within each injector cup. However, it is challenging to machine the distribution arm fuel passage through the injector cup bore into the log main fuel channel without piercing the bore and disturbing the integrity of the fuel distribution chamber, particularly in geometries in which a centerline of the bore is offset relative to a centerline of the main fuel channel. For example, in order to avoid disturbing the integrity of the fuel distribution chamber, machining is limited to providing a fuel passage that is aligned with a centerline of the bore and having a maximum offset from the centerline of the bore corresponding to a radius of the bore. Thus, the range of fuel distribution paths and the ability of the fuel rail structure to fit into the available space within the engine system is limited.

The connecting fuel passage between the injector cup and fuel log conveys the high pressure fuel from the log main fuel channel to the injector cup bore. This passage must be free of contamination and burrs that would affect function and durability. The EDM assembly including the flexible electrode may be used to machine the fuel passage. In particular, by using the flexible rotating EDM electrode, the fuel passage can be machined from an entry location that is inside the injector cup bore, and extends through the distribution arm to the log main fuel channel.

The entry location of the hole that provides the fuel passage between the injector cup bore and the log main fuel channel is disposed in the bore, for example in the sidewall of the bore. This is achieved by inserting the EDM electrode into the bore open end along a path aligned with a longitudinal axis of the bore, and bending the EDM electrode so that it enters the bore sidewall at a location corresponding to the distribution arm. Since it is possible to bend the EDM electrode and machine a hole in the bore sidewall, the length of the distribution arm and the location of the fuel injector cup relative to the log can be set to provide greater offsets and at non-zero angles relative to the centerline of the bore. Thus, the fuel passage that connects the main fuel channel of the log to the bore of the integral injector cup is formed through the injector cup via an entry formed in a sidewall of the injector cup and extending at an angle to the centerline of the bore, allowing for an offset from the center line of the log in two orthogonal directions that are perpendicular to a centerline of the main fuel channel. By machining in this manner, the engine designers have increased flexibility to package the fuel rail assembly to the engine. Moreover, the fuel rail disclosed herein is "backward compatible." That is, a given engine can be upgraded with limited redesign and testing of the fuel injectors, pressure sensors, conning tubes and electrical harnesses, etc. saving the builder time and money while reducing risk of untested components. In addition, the fuel rail disclosed herein allows re-use of equipment and process measures.

The EDM electrode forms a clean hole that can be deburred with electro polishing of the completed fuel rail. hi some embodiments, the diameter of the hole that provides the fuel passage can range from 1 mm-3.5 mm. The length of the fuel passage, combined with the diameter of the fuel passage, can be set to provide a pressure damping affect that can supplement or replace the orifice which is commonly found in the rail inlet fitting or injector body. This reduces cost of that fitting and or injector.

The EDM process is ideally suited for forming the fuel passage since EDM is a precise process and the material removed by EDM is dissolved and/or removed via the dielectric fluid. whereby the resulting hole is clean and can be deburred via electro-polishing of the completed fuel rail device. Importantly, the EDM process leaves no chips, debris or other contaminants in the machined part, which can negatively affect function and durability. Although other machining methods can be employed to form the fuel passage, such as twist drilling, laser burning, plasma burning, and water jet erosion, the other machining methods may not suitable in some embodiments due to potential for contamination, relative impreciseness and/or relatively poor shaping control. In addition, the EDM process may reduce production times relative to some of the other processes with respect to the time required to form a given hole or passage.

In some aspects, an EDM electrode includes an electrode first end, an electrode second end opposed to the electrode first end, and an electrode longitudinal axis that extends between the electrode first end and the electrode second end. The EDM electrode includes an electrode axial opening that extends between, and opens at, the electrode first end and the electrode second end. In addition, the EDM electrode includes an electrode first portion that includes the electrode first end, and an electrode second portion that includes the electrode second end. The EDM electrode is electrically conductive, the electrode first portion has a first flexibility, the electrode second portion has a second flexibility, and the second flexibility is less than the first flexibility.

In some embodiments, the electrode first. portion is a helical spring, and the electrode second portion is a tube.

In some embodiments, the electrode first portion has sufficient flexibility to bend upon application of a bending force to the electrode first portion, and the bend corresponds to a deflection angle of the first end relative to the longitudinal axis of at least 20 degrees. In addition, the electrode first portion has sufficient elasticity to return to a linear configuration in which the deflection angle is zero upon removal of the bending force.

In some embodiments, the electrode includes an electrode inner surface that defines the axial opening. In addition, the electrode first portion includes a channel in the surface of the electrode, the channel communicating with the axial opening and extending along a helical path between the electrode first end and the electrode second portion.

In some embodiments, the channel has a rectangular profile.

In some embodiments, the electrode first portion includes an axially-extending fluid path corresponding to the axial opening that allows fluid communication between the axial opening and an exterior of the electrode, and a second fluid path that allows fluid communication between the axial opening and an exterior of the electrode, the second fluid path extending radially with respect to the longitudinal axis.

In some embodiments, the electrode second portion is free of the second fluid path.

In some aspects, an EDM assembly includes a mounting device that is configured to support an EDM electrode relative to a work piece. The mounting device includes a back plate having a back plate first surface, a back plate second surface that is opposed to the back plate first surface, and a side surface that extends between the back plate first surface and the back plate second surface. The mounting device includes an upright portion that protrudes from the back plate first surface, and a tubular sleeve disposed in a through hole that extends through the back plate and the upright portion. The through hole is aligned with an axis that is perpendicular to the back plate first surface. The sleeve includes a sleeve first end, a sleeve second end, and a sleeve inner surface that defines a sleeve passageway that extends between the sleeve first end and the sleeve second end. The sleeve is disposed in the through hole in such a way that the sleeve first end protrudes from an end of the through hole.

In some embodiments, the sleeve is disposed in the through hole in such a way that the sleeve first end and the sleeve second end protrude from opposed ends of the through hole.

In some embodiments, the sleeve is fixed within the through hole.

In some embodiments, the sleeve first end is disposed outside the through hole on a side of the back plate corresponding to the back plate first surface, and the sleeve second end is disposed outside the through hole on a side of the back plate corresponding to the back plate second surface. In addition, the sleeve includes a curved portion, and the curved portion is disposed outside the through hole and between the sleeve first end and the upright portion.

In some embodiments, the sleeve includes a curved portion that is closer to the sleeve first end than the sleeve second end and is disposed outside the through hole, and a linear portion that extends between the curved portion and the sleeve second end. At least a portion of the linear portion being disposed in the through hole.

In some embodiments, the curved portion provides a bend having a bend angle in a range of zero degrees to 90 degrees relative to a line that is parallel to the linear portion.

In some embodiments, the upright portion has a proximal end that adjoins the back plate, a distal end that is spaced apart from the proximal end, a side surface that extends between the proximal end and the distal end, and a flat disposed at the intersection of the distal end and the side surface, the flat being angled relative to the distal end and the side surface.

In some embodiments, the upright portion has a proximal end that adjoins the back plate, a distal end that is spaced apart from the proximal end, a cylindrical side surface that extends between the proximal end and the distal end, and an upright portion centerline that is equidistant from all portions of the side surface. The through hole is parallel to, and offset from, the upright portion centerline.

In some embodiments, the EDM assembly includes the EDM electrode, which is configured to be received within the sleeve passageway.

In some embodiments, the sleeve includes a curved portion that is closer to the sleeve first end than the sleeve second end, the curved portion is disposed outside the through hole.

In some embodiments, the EDM electrode is disposed in the sleeve passageway, and the first flexibility is greater than a flexibility of the sleeve. In addition, a portion of the EDM electrode disposed in the curved portion deflects to accommodate the shape of the curved portion.

In some embodiments, the EDM electrode is rotationally and longitudinally moveable within the sleeve passageway.

In some embodiments, the EDM electrode is capable of recovering its original shape when released after undergoing bending within the curved portion.

In some embodiments, the back plate includes fastener holes that extend between the back plate first surface and the back plate second surface, the fastener holes being disposed between the upright portion and the back plate side surface.

In some embodiments, the back plate includes a recess provided in the back plate second surface, In some embodiments, the recess has a greater radial dimension than the through hole, and the recess is concentric with a centerline of the back plate.

In some embodiments, the upright portion includes a proximal end that adjoins the back plate, and a distal end that is opposed to the proximal and is spaced apart from the back plate. The distal end has a protrusion, and the protrusion has a curved profile.

In some embodiments, the back plate is a first cylinder that includes a first height dimension that is parallel to a centerline of the through hole, and a first radial dimension that is perpendicular to the centerline of the through hole. The first height dimension is less than the first radial dimension, and the upright portion is a second cylinder that includes a second height dimension that is parallel to the centerline of the through hole, and a second radial dimension that is perpendicular to the centerline of the through hole, the second height dimension being greater the second radial dimension and greater than the first height dimension.

DETAILED DESCRIPTION

Figure 1:
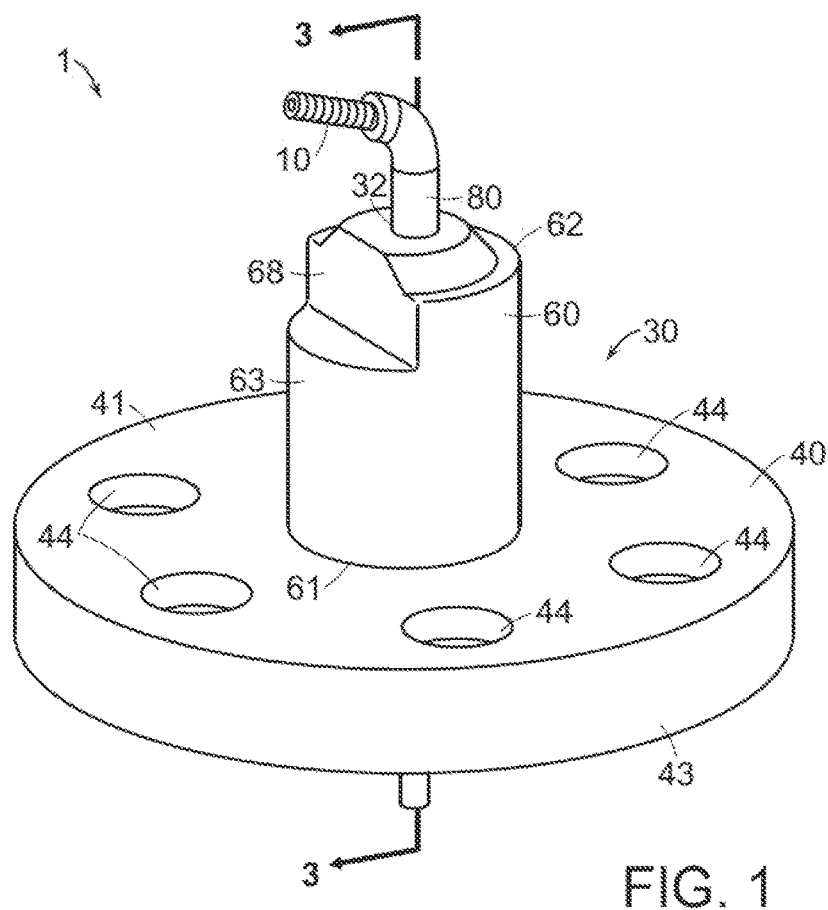
FIG. 1 is a top perspective view of an EDM assembly including a mounting device and an EDM electrode.
Figure 2:
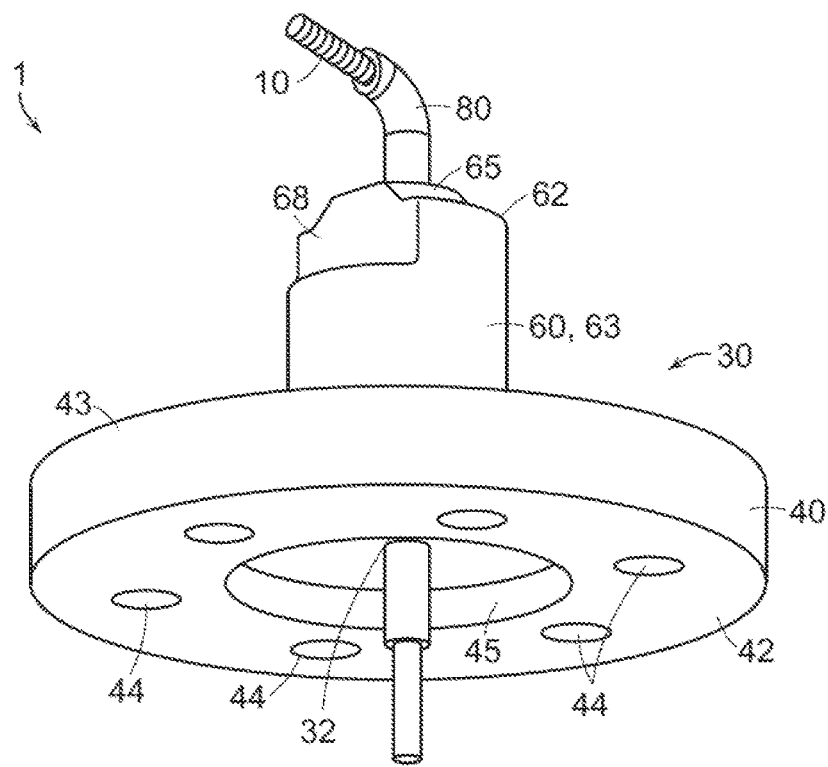
FIG. 2 is a bottom perspective view of the EDM assembly of FIG. 1.
Figure 3:
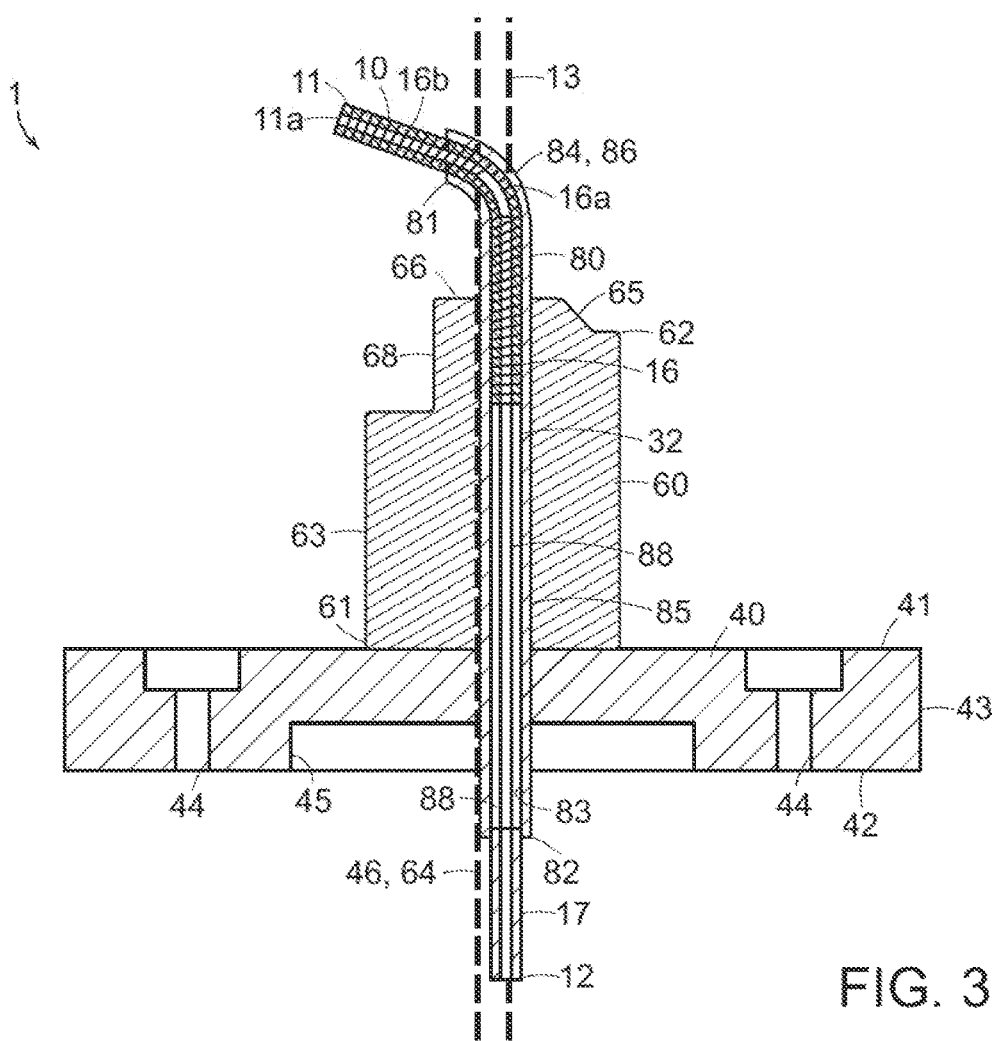
FIG. 3 is a cross-sectional view of the EDM assembly of FIG. 1 as, seen along line 3-3 of FIG. 1.
Figure 4:
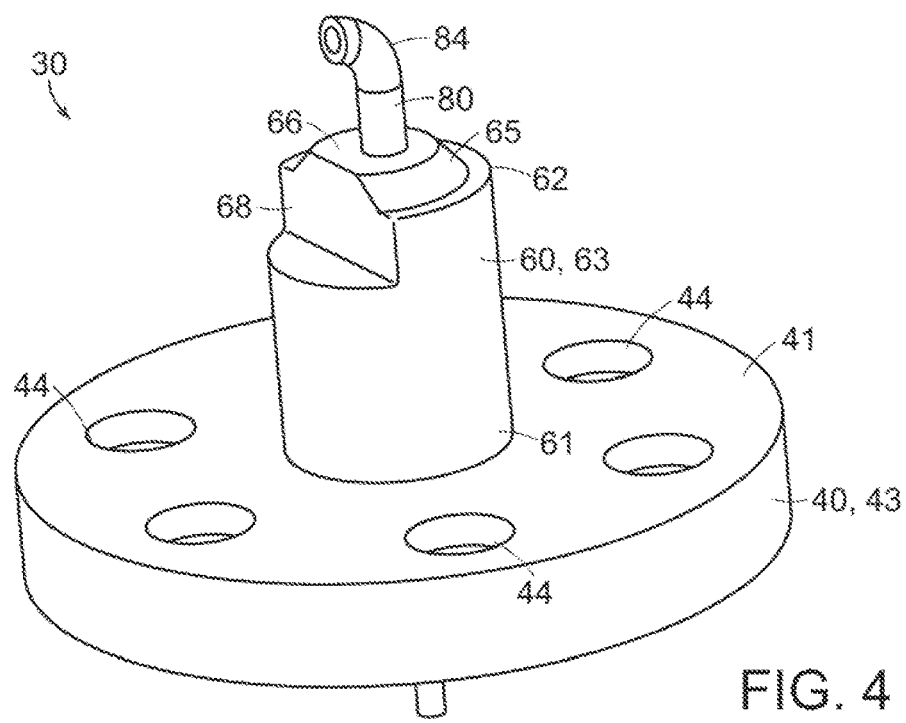
FIG. 4 is a top perspective view of mounting device of the EDM assembly of FIG. 1.

Referring to FIGS. 1-2 and 11-12. an EDM assembly 1 is suitable for use in an EDM process. More particularly, the EDM assembly 1 is suitable for electrical discharge machining of holes in a metal work piece 2 such as a monolithic fuel rail precursor. The EDM assembly 1 includes an electrically conductive EDM electrode 10 and a non-eclectically conductive mounting device 30 that is configured to support the EDM electrode 10 relative to the work piece 2. The EDM electrode 10 is slideably received in, and supported by, rigid sleeve 80 of the mounting device 30, as discussed further below. The EDM electrode 10 is configured to be electrically connected to a voltage generator (not shown) as part of an electrical circuit that includes the EDM electrode 10, the voltage generator, and the metal work piece 2. The mounting device 30 is a rigid support structure, and includes a back plate 40, an upright portion 60 that protrudes from the first, or work piece 2-facing, surface 41 of the back plate 40, and the sleeve 80. The sleeve 80 extends through the back plate 40 and the upright portion 60. In some embodiments, the mounting device 30 may be connected to a stage (not shown) that is moved relative to the work piece 2 by a servomotor or other appropriate actuator (not shown). In other embodiments, the mounting device 30 may be directly connected to the actuator. The EDM electrode 10 is elastic (e.g., flexible and resilient), and is received in, and supported by, the sleeve 80, which includes a curved portion 84 that deflects one end of the EDM electrode 10 as it is fed through the mounting device 30 in a machining process. The EDM assembly 1, including the EDM electrode 10 supported by the mounting device 30, may be used to form complex blind holes or through holes in the work piece 2, as discussed in detail below.

Figure 5:
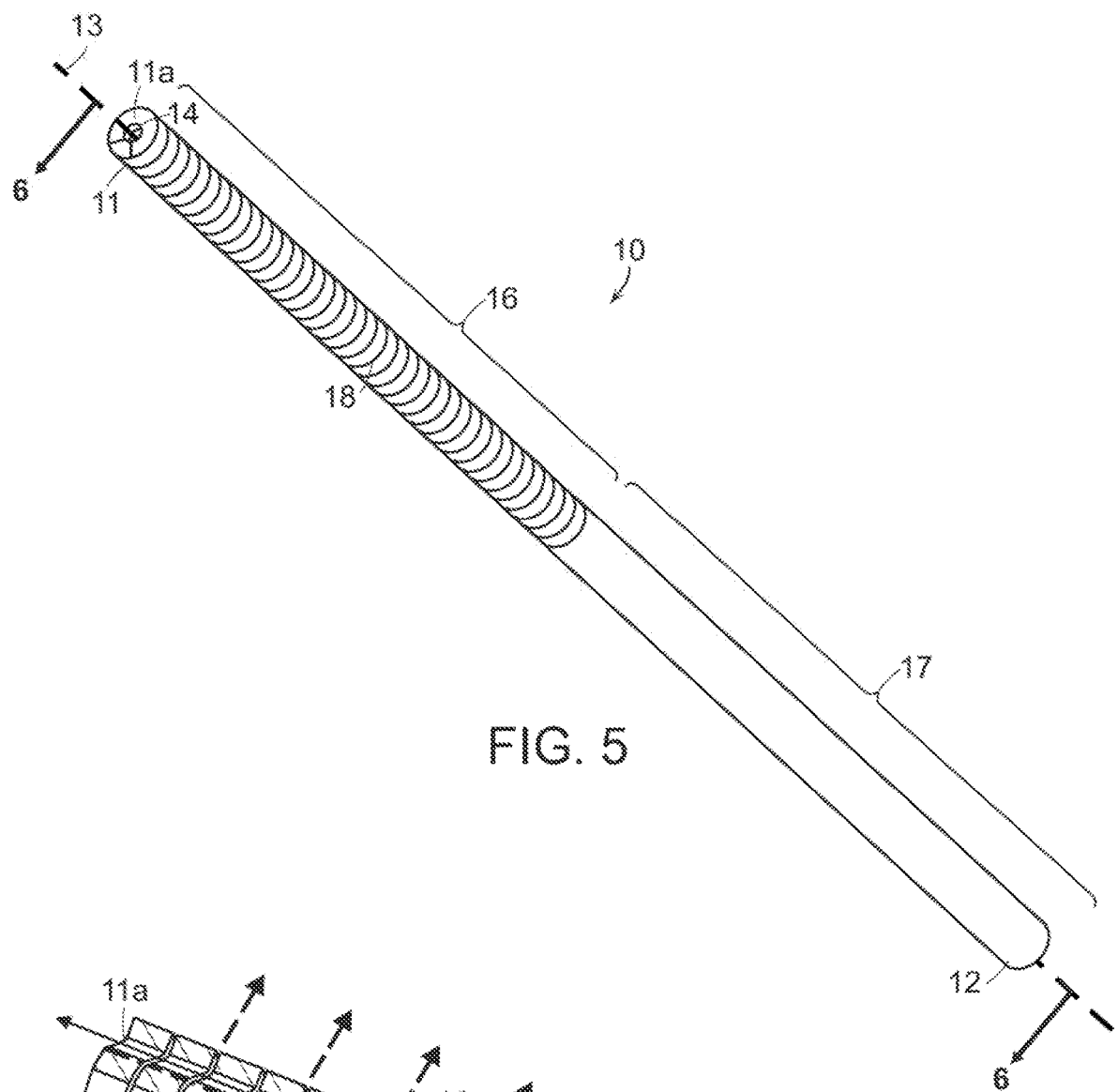
FIG. 5 is a perspective view of the EDM electrode of FIG. 1.
Figure 6:
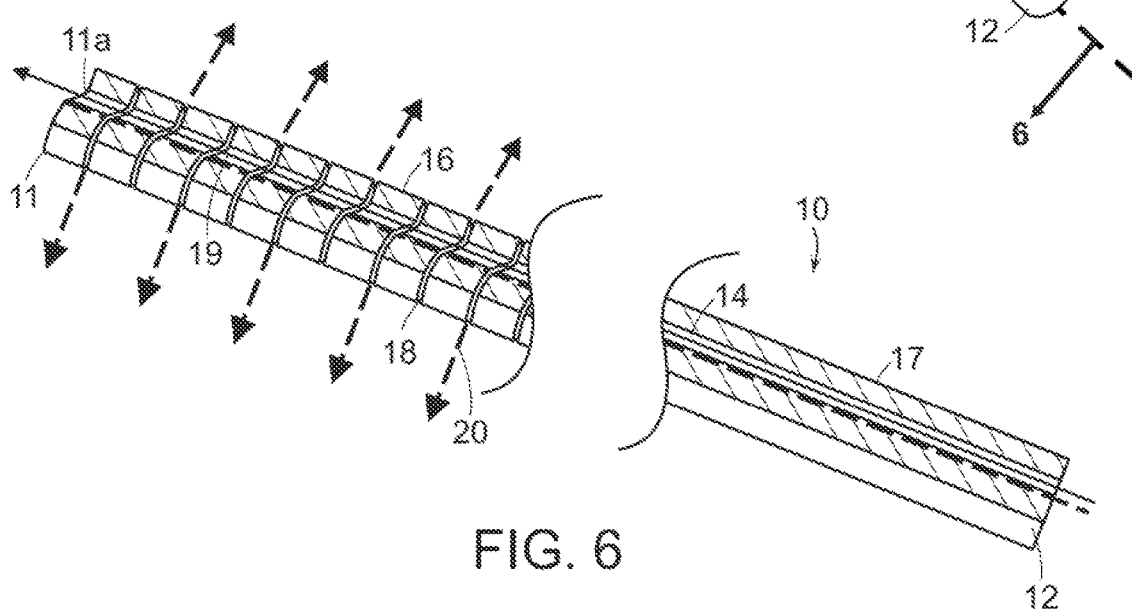
FIG. 6 is an enlarged cross-sectional view of the EDM electrode as along line 6-6 of FIG. 5.

Referring to FIGS. 5-6, the EDM electrode 10 is an elongate, hollow cylindrical structure that includes an electrode first end 11 and an electrode second end 12 that is opposed to the electrode first end 11. The EDM electrode 10 includes an electrode longitudinal axis 13 that extends between the electrode first and second ends 11, 12, and an axial opening 14 that extends between, and opens at each of the electrode first and second ends 11, 12. The end surface 11a of the electrode first end 11 is generally perpendicular to the electrode longitudinal axis 13, and provides the "discharge surface" of the EDM electrode. In the EDM process, the end surface 11a is the surface from which electricity discharges toward the work piece 2, resulting in material removal from the work piece 2 in the vicinity of the end surface 11a, as well as from the electrode first end 11. The axial opening 14 provides a longitudinal fluid path 19 through the EDM electrode 10 through which dielectric fluid is supplied to the discharge surface during the EDM process.

The EDM electrode 10 includes a first portion 16 that includes the electrode first end 11, and a second portion 17 that includes the electrode second end 12. The first portion 16 has, a first flexibility, the second portion 17 has a second flexibility, and the first flexibility is greater than the second flexibility. For example, in some embodiments, the first portion 16 has sufficient flexibility to bend upon application of a relatively low bending force (for example, a force in a range of 5 N to 20 N) to the first portion 16, the bend corresponding to a deflection angle of the electrode first end 11 relative to the longitudinal axis 13 of at least 20 degrees. In addition, upon removal of the bending force, the electrode first portion 16 has sufficient elasticity to return to a linear configuration in which the deflection angle is zero. The second portion 17 is sufficiently, rigid to remain linear during application of the bending force.

In the illustrated embodiment, the electrode first portion 16 is a helical spring, and the electrode second portion 17 is a closed-wall tube. The EDM electrode 10 may be formed by cutting a helical channel 18 into a portion of an electrically conductive closed-wall tube. For example, in the illustrated embodiment, the channel 18 extends along a helical path between the electrode first end 11 and the electrode second portion 17, whereby the spring or first portion 16 corresponds to about one half of the overall length of the EDM electrode 10. An EDM wire cutting process may be used to form the helical channel 18, Which has a rectangular profile and communicates with the axial opening 14. The channel 18 does not extend into the electrode second portion 17. By this configuration, the electrode second portion 17 has less flexibility than the electrode first portion 16, and provides an attachment region by which the EDM electrode can be electrically connected to the voltage generator and to a feed mechanism (not shown) that rotates the EDM electrode 10 and advances the EDM electrode 10 through the sleeve 80 of the mounting device 30 during an EDM operation.

As previously discussed, the axial opening 14 provides a first, longitudinal fluid path 19 through the EDM electrode 10 through which dielectric fluid is supplied to end surface 11a of the electrode first end 11 during an EDM process. The first fluid path 19 is represented as a solid arrow in FIG. 6. The EDM electrode 10 also provides a second fluid path 20 that allows fluid communication between the axial opening 14 and an exterior of the EDM electrode 10. The second fluid path 20 corresponds to the channel 18 (e.g., the space between turns of the helix), which permits a flow of the dielectric fluid in a radial direction with respect to the electrode longitudinal axis 13 and a generally increased flow of dielectric fluid in the vicinity of the electrode end surface 11a. The second fluid path 20 is represented by broken-line arrows in FIG. 6. Although the broken-line arrows are not shown at all locations of the channel 18, it is understood that the dielectric fluid exits the axial opening 14 in a radial direction all along the channel 18. By increasing the volume of dielectric fluid flow in the vicinity of the electrode end surface 11a, the risk of dielectric break down of the dielectric fluid in this region may be decreased. By generating a turbulence in the dielectric fluid flow in the vicinity of the electrode end surface 11a due to fluid flow in both the longitudinal and radial directions, removal of eroded debris from this region is improved.

The material used to form the EDM electrode 10 is selected based, in part, on the material of the work piece 2. In the example in which the work piece 2 is a monolithic fuel rail precursor formed of a stainless steel, the EDM electrode 10 may be formed of copper or graphite.

Referring to FIGS. 1-4, the mounting device 30 is a rigid structure used to support the EDM electrode relative to the work piece 2 during an EDM process. The mounting device 30 includes the back plate 40 that is configured to be mounted to a stage or actuator, the upright portion 60 that protrudes from the back plate 40, and the sleeve 80 that extends through a through hole 32 provided the back plate 40 and the upright portion 60. The mounting device 30 will now be described in detail.

The back plate 40 is a thick plate, and includes a back plate first surface 41 that faces the work piece 2, a back plate second surface 42 that is opposed to the back plate first surface 41, and a side surface 43 that extends between the back plate first surface 41 and the back plate second surface 42. In the illustrated embodiment, the back plate 40 has a circular profile Whereby the back plate 40 is a low profile cylinder. The term "low profile" refers to the height dimension of the back plate 40 being much less than the radial dimension of the back plate 40. The through hole 32 is co-linear with a centerline 46 of the back plate 40, where the back plate centerline 46 is equidistant from the back plate side surface 43 and extends in parallel to the back plate side surface 43. The back plate 40 includes fastener holes 44 that extend between the back plate first and second surfaces 41, 42. The fastener holes 44 are spaced apart from each other, and are disposed between the back plate side surface 43 and the upright portion 60. In addition, the hack plate 40 includes a recess 45 that is provided in the back plate second surface 42. The recess 45 is concentric with the back plate centerline 46, and has a greater radial dimension than the through hole 32.

The upright portion 60 is a high profile cylinder that protrudes from the hack plate first surface 41 toward the work piece 2. The term "high profile" refers to the height dimension of the upright portion 60 being much greater than the radial dimension of the upright portion 60. The upright portion 60 includes a proximal end 61 that adjoins the back plate first surface 41, and a distal end 62 that is opposed to the proximal end 61 and is spaced apart from the back plate 40. The upright portion 60 includes a curved side surface 63 that extends between the proximal and distal ends 61, 62. A centerline 64 of the upright portion 60 is coincident with the back plate centerline 46, where the upright portion centerline 64 is equidistant from the upright portion side surface 63 and extends in parallel to the upright portion side surface 63. The radial dimension of the upright portion 60 is much less than the radial dimension of the back plate 40, whereby the upright portion side surface 63 is spaced radially inward with respect to the back plate side surface 43.

The distal end 62 of the upright portion 60 includes a protrusion 65 that is disposed radially inward with respect to the upright portion side surface 63. The protrusion 65 may have the shape of a truncated sphere or cone, whereby the protrusion 65 has a curved profile when viewed in a direction parallel to the upright portion centerline 64, and a planar terminal end 66 when viewed in a direction perpendicular to the upright portion centerline 64. The protrusion 65 is shaped and dimensioned to permit partial insertion into a circular access opening in a work piece 2, and serves to center the upright portion distal end 62 with respect to the. work piece access opening 3, as discussed below.

The upright portion 60 includes flat 68 that is provided in the upright portion side surface 63 at the intersection of the upright portion side surface 63 and the proximal end 61. The flat 68 is parallel to the upright portion centerline 64. The flat 68 is located between the upright portion centerline 64 and the side surface 63. In some embodiments, the flat 68 has a height dimension that is in a range of ten percent to fifty percent of the height dimension of the upright portion 60. In some applications, the flat 68 provides a visual reference that indicates a rotational orientation of the mounting device 30 and/or the sleeve 80 when in use during an EDM operation. In addition, since the flat 68 is a recessed discontinuity in the circular profile of the distal end 62, the flat 68 provides a path by which dielectric fluid may escape from the vicinity of the electrode end surface 11a during an EDM operation, as discussed below.

The through hole 32 extends linearly, and passes through the back. plate 40 and the upright portion 60. The through hole 32 has a cross-sectional shape and dimensions that accommodate the shape and dimensions of the sleeve 80. The through hole 32 is parallel to the centerlines 46, 64 of the back plate 40 and the upright portion 60. In some embodiments, the through hole 32 is coincident with the centerlines 46, 64 of the back plate 40 and the upright portion 60. In other embodiments (FIG. 3), the through hole 32 is offset relative to the centerlines 46, 64 of the back plate 40 and the upright portion 60. By providing an offset of the through hole 32, it may be possible to provide an increased bend angle of the curved portion 84 of the sleeve 80 (described below), which in turn increases the range of possible direction change angles which the hole cut by the EI)M electrode 10 can achieve.

Referring to FIGS. 3-4 and 7-8, the sleeve 80 is an elongate tube that is fixed within the through hole 32. The sleeve 80 includes a sleeve first end 81 and a sleeve second end 82 that is opposed to the sleeve first end 81. The sleeve 80 includes an inner surface 83 that defines a sleeve passageway 88 that extends between the sleeve first and second ends 81, 82. In use, the EDM electrode 10 resides in the sleeve passageway 88, and is axially movable within the sleeve passageway 88 so that the EDM electrode 10 can be advanced toward and/or into the work piece 2 during an EDM operation.

The sleeve 80 has an axial dimension that is greater than the axial dimension of the through hole 32, and the sleeve first and second ends 81, 82 protrude from opposed ends of the through hole 32. In particular, the sleeve first end 81 is disposed outside the through hole 32 on a side of the back plate 40 corresponding to the back plate first surface 41. In addition, the sleeve second end 82 is disposed outside the through hole 32 on a side of the back plate 40 corresponding to the back plate second surface 42.

Figure 7:
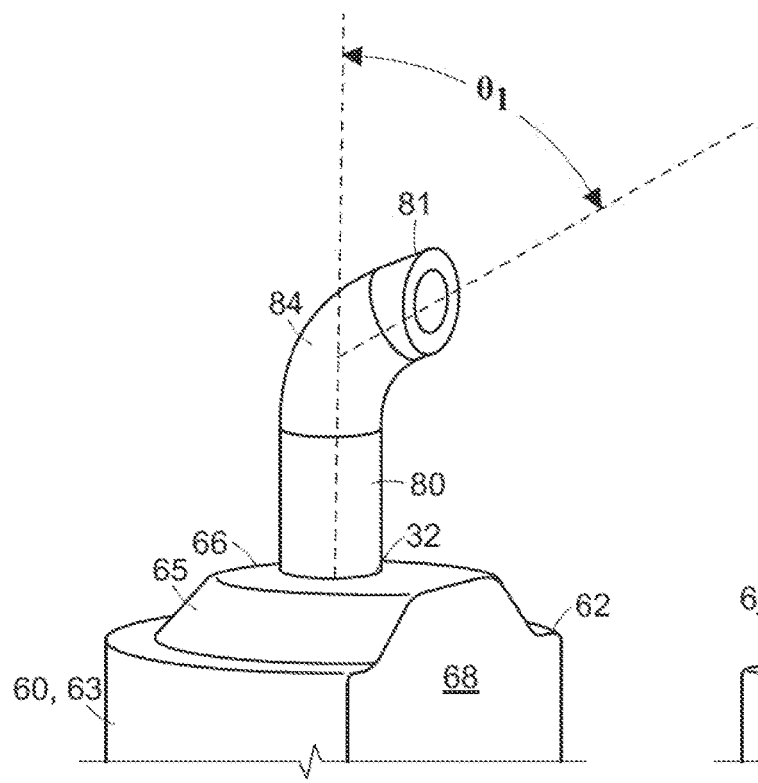
FIG. 7 is a perspective view of a portion of the EDM assembly of FIG. 1 with the EDM electrode omitted.
Figure 8:
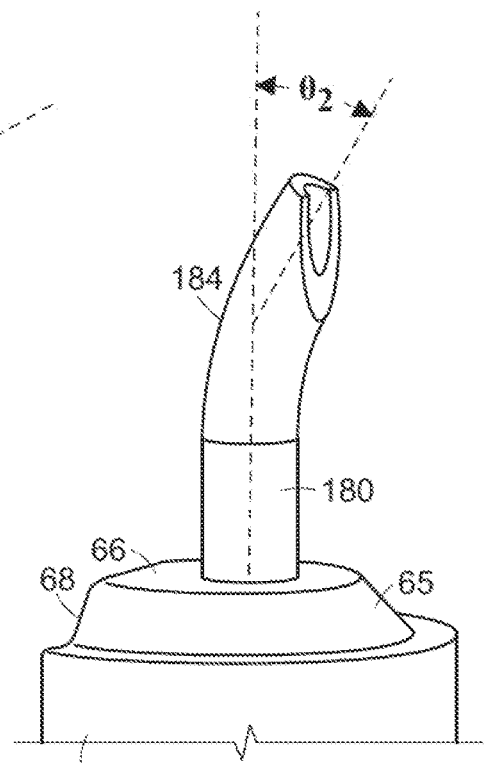
FIG. 8 is a perspective view of a portion of an alternative embodiment EDM assembly with the EDM electrode omitted.

The sleeve 80 includes a curved portion 84 that is disposed is closer to the sleeve first end 81 than the sleeve second end 82, and a linear portion 85 that extends between the curved portion 84 and the sleeve second end 82. The curved portion 84 resides outside the through hole 32, and is disposed between the sleeve first end 81 and the upright portion 60. In the illustrated embodiment, the curved portion 84 includes a single bend having a bend angle θ in a range of zero degrees to 90 degrees relative to a line that is parallel to the linear portion 85. In FIG. 7, the sleeve 80 has a bend angle θ1 of about 70 degrees. In FIG. 8, an alternative embodiment sleeve 180 has a bend angle θ2 of about 30 degrees. In other embodiments, the curved portion 84 may include multiple sequential bends.

The mounting device 30 may be formed on any appropriate non-electrically conductive material. In some embodiments, the base plate 40, the upright portion 60 and sleeve 80 may each be formed of the same material, while in other embodiments, the mounting device 30 is not limited to this configuration. In some embodiments, the sleeve 80 be formed of nylon, hardened plastic or pyrex.

Figure 9:
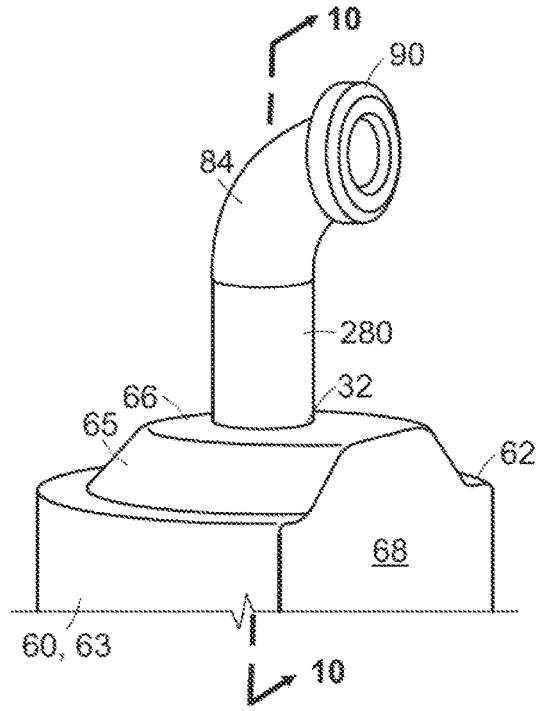
FIG. 9 is a perspective view of a portion of another alternative embodiment EDM assembly with the EDM electrode omitted.
Figure 10:
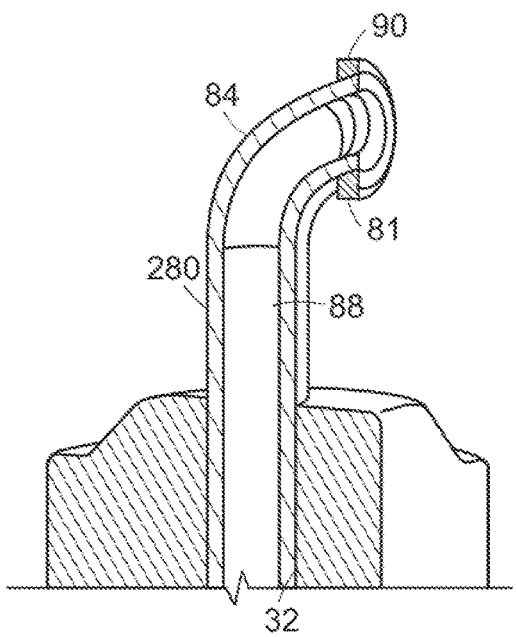
FIG. 10 is a cross-sectional view of the EDM assembly of FIG. 9 as seen along line 10-10 of FIG. 9.
Figure 11:
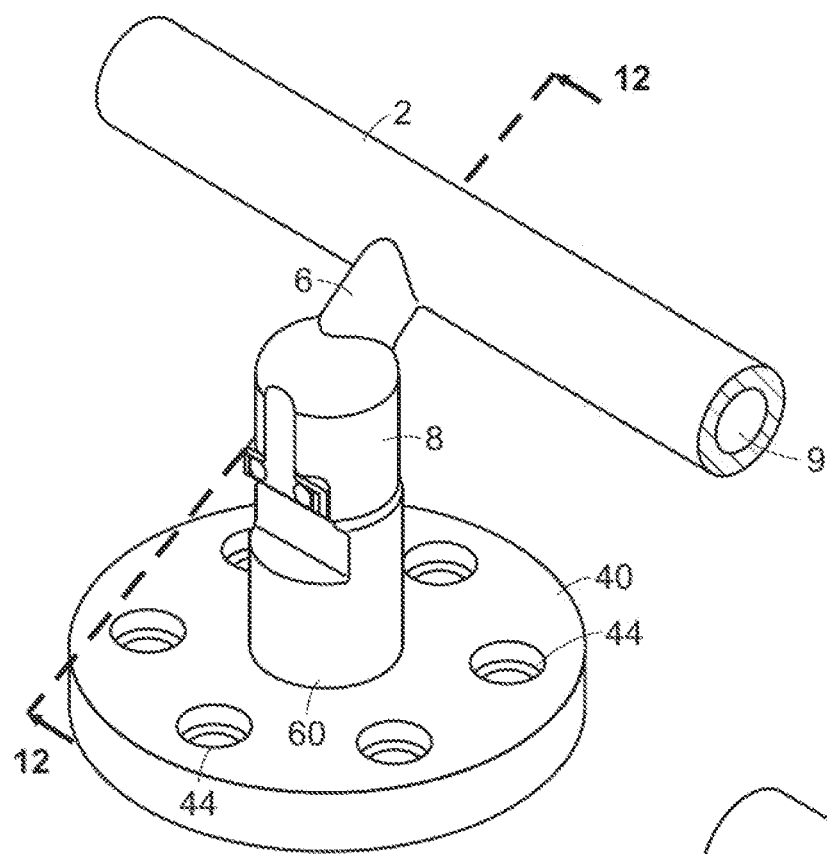
FIG. 11 is a perspective view of a portion of a monolithic fuel rail structure illustrating the EDM assembly partially inserted into an open end of an injector cup.
Figure 12:
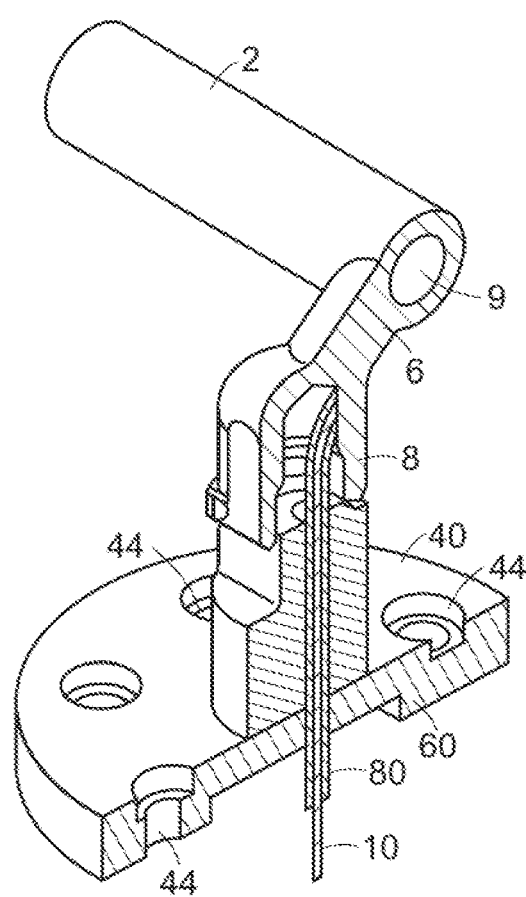
FIG. 12 is a cross sectional view of the monolithic fuel rail structure of FIG. 11 as seen along line 12-12 of FIG. 11.

Referring to FIGS. 9 and 10, another alternative embodiment sleeve 280 may be used with the base plate 40 and upright portion 60 to support the EDM electrode 10. The alternative embodiment sleeve 280 is similar to the sleeve 80 described above with respect to FIGS. 1-7, and common reference numbers are used to refer to common elements.

The sleeve 280 illustrated in FIGS. 9 and 10 differs from the earlier embodiment in that it includes an insert 90 disposed in the sleeve first end 81. The insert 90 is an annular structure, provides a cover for the end face 89 of the sleeve first end 81, and wraps over the sleeve inner surface 83 at locations adjacent to the end. face 89. The insert 90 improves the wear resistance of the sleeve 80, and is formed of a wear resistant and electrically non-conductive material such as ceramic.

In use, the EDM electrode 10 is supported relative to the work piece 2 by the mounting device 30 with the electrode first end 11 protruding from the sleeve first end 81. For example, the EDM electrode 10 may be positioned near the work piece 2 so that a small gap exists between the end face 11a of the electrode first end 11 and the work piece 2. As material is removed from the work piece 2, the EDM electrode 10 is consumed. To maintain the appropriate gap as the work piece 2 is shaped and the EDM electrode 10 is consumed, the EDM electrode 10 is advanced through the sleeve 80 toward the work piece 2 during the EDM operation.

Thus, in use, the first portion 16 of the EDM electrode 10 resides in, and passes through, the curved portion 84 of the sleeve 80. The sleeve 80 is much less flexible than the first portion 16 of the EDM electrode 10, and the first portion 16 of the EDM electrode 10 deflects to accommodate the shape of the curved portion 48. In other words, portions 16a of the EDM electrode first portion 16 residing in the curved portion 84 conform to the shape of the curved portion 84. The EDM electrode 10 is elastic such that portions 16b of the EDM electrode first portion 16 that protrude out of the sleeve first end 81 return to a linear configuration. In other words, the EDM electrode 10 recovers its original shape when released after undergoing bending within the sleeve curved portion 84.

Referring to FIGS. 11-17, in the example in which the work piece 2 is a monolithic fuel rail precursor, the fuel rail precursor is a forged, monolithic metal structure which is machined using an EDM process to provide a finished fuel rail (not shown). The. finished fuel rail is configured to supply fuel to multiple fuel injectors (not shown) that inject fuel directly into the cylinders of an internal combustion engine (not shown). The fuel rail precursor 2 includes a log 5 that receives high pressure fuel from a fuel tank or fuel pump (not shown). The fuel rail precursor 2 includes integral distribution arms 6 that are spaced apart along the length of the log 5 and protrude from an outer surface of the log 5. As used herein, the term "integral" is defined as "being of the whole, being formed as a single unit with another part." In FIGS. 11 and 12, only a portion of the fuel rail precursor 2 is shown, and the portion shown includes a single distribution arm 6. Each distribution arm 6 is configured to distribute pressurized fuel to a respective individual cylinder of the engine. Each distribution arm 6 terminates in an integral injector cup 8. which is configured to receive and retain an inlet end of a fuel injector (not shown). Fuel is provided at high pressure to each injector cup 8 via a main fuel channel 9 of the log 5 and a fuel passageway 100 (FIG. 16) provided in each of the respective distribution arms 6. Thus high pressure fuel received in the finished fuel rail is distributed directly into each cylinder of the engine via a respective distribution arm 6, injector cup 8 and fuel injector. The relative geometry of the log 5, distribution arms 6 and injector cups 8 is complex, and is dependent on engine geometry and available space within the engine system.

The fuel passageway 100 may be formed in the distribution arm 6 of the fuel rail precursor 2 so as to extend between the main fuel channel 9 of the log 5 and the injector cup via an. EDM process that employs the EDM assembly 1. The EDM assembly 1 supports the EDM electrode 10 relative to the fuel rail precursor 2. FIGS. 13-17 illustrate one example of how the EDM assembly 1 and EDM electrode 10 may be used to form the fuel passageway 100 in the distribution arm 6 of the fuel rail precursor 2.

Figure 13:
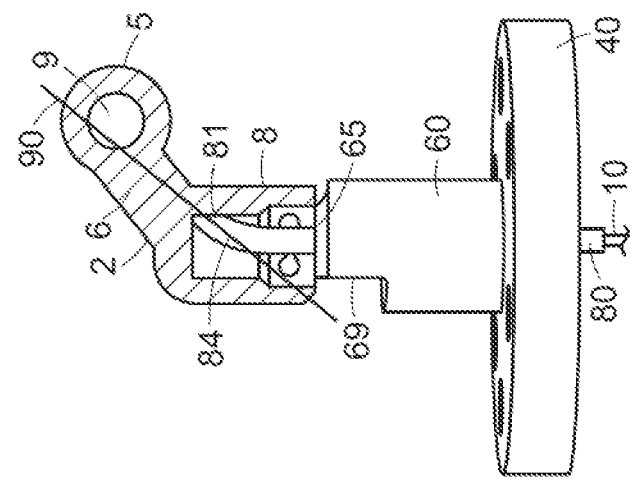
FIG. 13 is a cross sectional view of a monolithic fuel rail structure of FIG. 11, illustrating the EDM assembly inserted into a bore of an injector cup with the EDM electrode in position to begin forming an entry hole in the injector cup sidewall.

As shown in FIG. 13, initially, the upright portion 60 of the mounting device 30 is positioned adjacent to the injector cup 8 so that the upright portion protrusion 65 is inserted into the open end of the injector cup 8. The protrusion 65 locates the EDM assembly 1 relative to the injector cup 8, while a gap is provided between the injector cup inner surface and the flat 69 of the upright portion 60. The gap permits dielectric fluid, which is pumped through the EDM electrode 10 along the first and second fluid paths 19, 20, to exit the injector cup 8 during the EDM process. The sleeve first end 81 is positioned so as to be closely spaced relative to an inner surface of the injector cup 8, at a location corresponding to an entry location of the EDM electrode 10 into the fuel rail precursor 2. The entry location coincides with a line 90 that extends between the log main fuel channel 9 and the interior space of the injector cup 8, and passes through the distribution arm 6.

Figure 14:
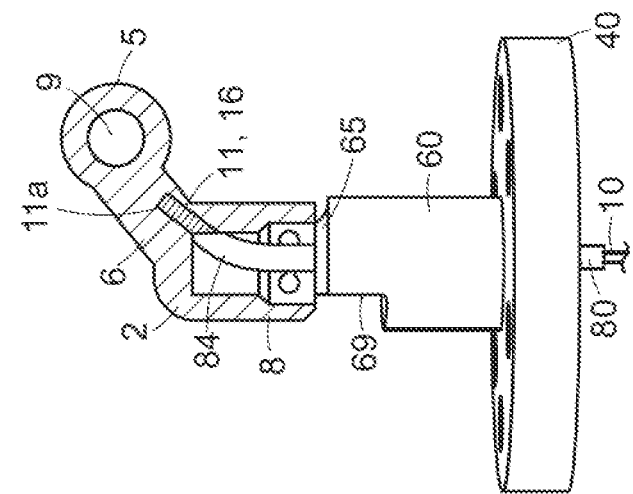
FIG. 14 is a cross sectional view of a monolithic fuel rail structure of FIG. 11, illustrating the EDM assembly inserted into a bore of an injector cup with the EDM electrode forming a passageway in the monolithic fuel rail structure.

As shown in FIG. 14, during the EDM process, the EDM electrode 10 is advanced through the sleeve 80 toward the fuel rail precursor 2. As the EDM electrode advances, the EDM electrode 10 is moved through the sleeve 80 longitudinally toward the sleeve first end 81, and is also rotated about the EDM electrode longitudinal axis 13. Moreover, electrical discharges are emitted from the electrode end surface 11a toward the fuel rail precursor 2, resulting in material removal from the fuel rail precursor 2 in the vicinity of the end surface 11a, whereby a hole is cut in the fuel rail precursor 2 having the shape of the electrode end surface 11a and dimensions that are slightly greater than the dimensions of the electrode end surface 11a.

Figure 15:
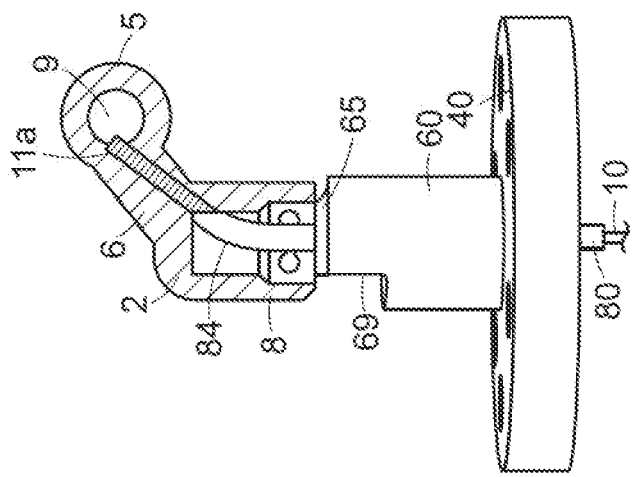
FIG. 15 is a cross sectional view of a monolithic fuel rail structure of FIG. 11, illustrating the EDM assembly inserted into a bore of an injector cup with the EDM electrode intersecting a main fuel channel of the monolithic fuel rail structure.

As shown in FIG. 15, the EDM process is continued until the electrode end surface 11a enters the main fuel channel 9 of the log 5. The hole cut by the EDM electrode through the distribution arm 6 provides a fluid communication path between the log main fuel channel 9 and the interior space of the injector cup 8, and corresponds to the fuel passageway 100.

Figure 16:
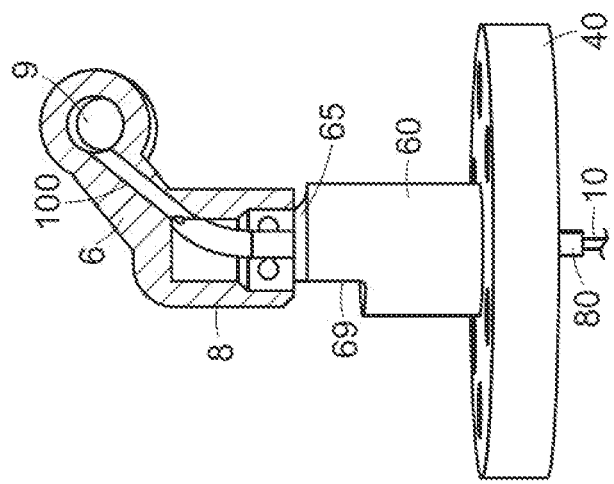
FIG. 16 is a cross sectional view of a monolithic fuel rail structure of FIG. 11, illustrating the EDM assembly inserted into a bore of an injector cup with the EDM electrode retracted from the sleeve following passageway completion.

As shown in FIG. 16, after the fuel passageway 100 is formed, the EDM electrode 10 is withdrawn from the fuel passageway 100. In some embodiments, the EDM electrode 10 may also be partially or fully withdrawn from the sleeve 80.

Figure 17:
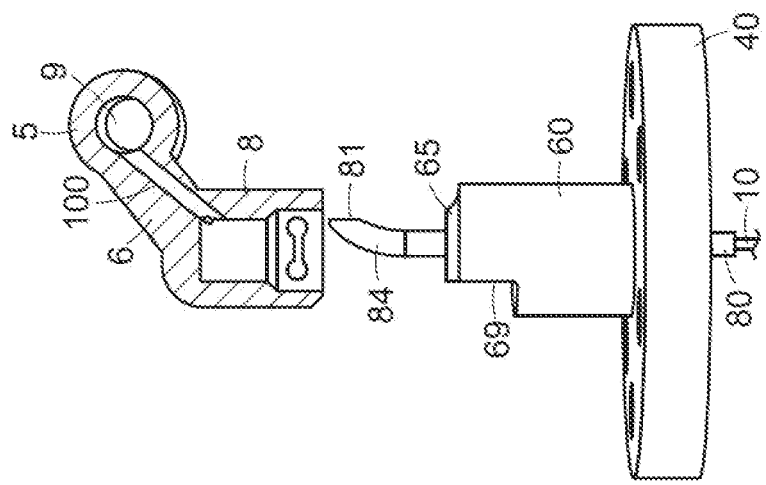
FIG. 17 is a cross sectional view of a monolithic fuel rail structure of FIG. 11, illustrating the EDM assembly withdrawn from a bore of an injector cup with the EDM electrode retracted from the sleeve following passageway completion.

As shown in FIG. 17, as a final step, the mounting device 30 is removed from the injector cup 8.

Although FIGS. 13-17 illustrate one example of how the EDM assembly 1 including the mounting device 30 and the EDM electrode 10 may be used to form the fuel passageway 100 in the distribution arm 6 of the fuel rail precursor, the EDM assembly 1 is not limited to being used as shown or in the sequence of events shown in FIGS. 13-17. Moreover, it is understood that the EDM assembly 1 is not limited to being used to machine the, fuel rail precursor 2, but can be used to form complex holes in any metal work piece.

Although the first, or spring, portion 16 of the EDM electrode 10 is described as being formed by cutting the helical channel 18 into a portion of an electrically conductive closed-wall tube, the EDM electrode 10 is not limited to being formed in an EDM wire cutting process. it is understood that other methods may be used to provide the EDM electrode.

Although the back plate 40 and the upright portion 60 are cylindrical in the illustrated embodiment, the back plate 40 and the upright portion 60 not limited to having a circular profile. For example, the back plate 40 may have a profile that accommodates the attachment requirements of the stage or actuator. In addition, the upright portion 60 may have a profile that accommodates the shape of the access opening of the work piece 2.

Selective illustrative embodiments of the EDM assembly including the mounting device and EDM electrode are described above in some detail. It should be understood that only structures considered necessary for clarifying the EDM assembly have been described herein. Other conventional structures, and those of ancillary and auxiliary components of the EDM assembly, are assumed to be known and understood by those skilled in the art. Moreover, while a working example of the EDM assembly, has been described above, the EDM assembly is not limited to the working example described above, but various design alterations may be carried out without departing from the EDM assembly, the mounting device and/or the EDM electrode as set forth in the claims.

We claim:

1. An electrical discharge machining (EDM) electrode, comprising:
    an electrode first end;
    an electrode second end opposed to the electrode first end;
    an electrode longitudinal axis that extends between the electrode first end and the electrode second end;
    an electrode axial opening that extends between, and opens at, the electrode first end and the electrode second end;
    an electrode first portion that includes the electrode first end; and
    an electrode second portion that includes the electrode second end, wherein
    the electrode is electrically conductive,
    the electrode first portion has a first flexibility,
    the electrode first portion includes
        an axially-extending fluid path corresponding to the axial opening that allows fluid communication between the axial opening and an exterior of the electrode, and
        a second fluid path that allows fluid communication between the axial opening and an exterior of the electrode, the second fluid path extending radially with respect to the longitudinal axis,
    the electrode second portion has a second flexibility, and
    the second flexibility is less than the first flexibility.

2. The EDM electrode of claim 1, wherein the electrode first portion is a helical spring, and the electrode second portion is a tube.

3. The EDM electrode of claim 1, wherein
    the electrode first portion bas sufficient flexibility to bend upon application of a bending force to the electrode first portion, the bend corresponding to a deflection angle of the first end relative to the longitudinal axis of at least 20 degrees, and
    the electrode first portion has sufficient elasticity to return to a linear configuration in which the deflection angle is zero upon removal of the bending force.

4. The EDM electrode of claim 1, wherein
    the electrode includes an electrode inner surface that defines the axial opening, and
    the electrode first portion includes a channel in the surface of the electrode, the channel communicating with the axial opening and extending along a helical path between the electrode first end and the electrode second portion.

5. The EDM electrode of claim 4, wherein the channel has a rectangular profile.

6. The EDM electrode of claim 1, wherein the electrode second portion is free of the second fluid path.

7. An electrical discharge machining (EDM) assembly comprising a mounting device that is configured to support an electrical discharge machining electrode relative to a work piece, the mounting device including:
- a back plate having a back plate first surface, a back plate second surface that is opposed to the back plate first surface, and a side surface that extends between the back plate first surface and the back plate second surface;
- an upright portion that protrudes from the back plate first surface; and
- a tubular sleeve disposed in a through hole that extends through the back plate and the upright portion, the through hole aligned with an axis that is perpendicular to the back plate first surface, the sleeve including
  - a sleeve first end,
  - a sleeve second end, and
  - a sleeve inner surface that defines a sleeve passageway that extends between the sleeve first end and the sleeve second end, wherein the sleeve is disposed in the through hole in such a way that the sleeve first end protrudes from an end of the through hole.

8. The EDM assembly of claim 7, wherein the sleeve is disposed in the through hole in such a way that the sleeve first end and the sleeve second end protrude from opposed ends of the through hole.

9. The EDM assembly of claim 7, wherein the sleeve is fixed within the through hole.

10. The EDM assembly of claim 7, wherein
the sleeve first end is disposed outside the through hole on a side of the back plate corresponding to the back plate first surface,
the sleeve second end is disposed outside the through hole on a side of the back plate corresponding to the back plate second surface, and
the sleeve includes a curved portion, and the curved portion is disposed outside the through hole and between the sleeve first end and the upright portion.

11. The EDM assembly of claim 7, wherein the sleeve includes:
- a curved portion that is closer to the sleeve first end than the sleeve second end and is disposed outside the through hole; and
- a linear portion that extends between the curved portion and the sleeve second end, at least a portion of the linear portion being disposed in the through hole.

12. The EDM assembly of claim 11, wherein the curved portion provides a bend having a bend angle in a range of zero degrees to 90 degrees relative to a line that is parallel to the linear portion.

13. The EDM assembly of claim 7, wherein
the upright portion has
- a proximal end that adjoins the back plate,
- a distal end that is spaced apart from the proximal end,
- a cylindrical side surface that extends between the proximal end and the distal end, and
- an upright portion centerline that is equidistant from all portions of the side surface, and wherein the through hole is parallel to, and offset from, the upright portion centerline.

14. The EDM assembly of claim 7, comprising an electrical discharge machining (EDM) electrode that is configured to be received within the sleeve passageway.

15. The EDM assembly of claim 14, wherein the EDM electrode comprises:
- an electrode first end;
- an electrode second end opposed to the electrode first end;
- an electrode longitudinal axis that extends between the electrode first end and the electrode second end;
- an electrode axial opening that extends between, and opens at, the electrode first end and the electrode second end;
- an electrode first portion that includes the electrode first end; and
- an electrode second portion that includes the electrode second end, wherein
the EDM electrode is electrically conductive,
the electrode first portion has a first flexibility,
the electrode second portion has a second flexibility,
the second flexibility is less than the first flexibility.

16. The EDM assembly of claim 15, wherein the electrode first portion is a helical spring, and the electrode second portion is a tube.

17. The EDM assembly of claim 15, wherein
the sleeve includes a curved portion that is closer to the sleeve first end than the sleeve second end,
the curved portion is disposed outside the through hole,
the EDM electrode is disposed in the sleeve passageway, and
the first flexibility is greater than a flexibility of the sleeve, and
a portion of the EDM electrode disposed in the curved portion deflects to accommodate the shape of the curved portion.

18. The EDM assembly of claim 15, wherein the EDM electrode is longitudinally moveable within the sleeve passageway.

19. The EDM assembly of claim 15, wherein the EDM electrode is capable of recovering its original shape when released after undergoing bending within the curved portion.

* * * * *